(12) United States Patent
Loh et al.

(10) Patent No.: US 7,398,538 B2
(45) Date of Patent: Jul. 8, 2008

(54) PICKUP UNIT HOMING MECHANISM FOR A DISK DRIVE UNIT

(75) Inventors: Kum Chung Loh, Singapore (SG); Yu Zhou, Singapore (SG); Chee Wai Shum, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 189 days.

(21) Appl. No.: 10/562,280

(22) PCT Filed: Jun. 23, 2004

(86) PCT No.: PCT/IB2004/050978

§ 371 (c)(1),
(2), (4) Date: Dec. 20, 2005

(87) PCT Pub. No.: WO2005/001834

PCT Pub. Date: Jan. 6, 2005

(65) Prior Publication Data

US 2006/0156323 A1     Jul. 13, 2006

(30) Foreign Application Priority Data

Jun. 27, 2003   (EP)  .................................. 03101927

(51) Int. Cl.
*G11B 21/02*  (2006.01)
(52) U.S. Cl. ........................ 720/664; 720/672
(58) Field of Classification Search ................. 720/663, 720/664, 672, 676
See application file for complete search history.

(56) References Cited

U.S. PATENT DOCUMENTS

| 4,697,259 A | 9/1987 | Takanashi |
| 5,307,339 A * | 4/1994 | Tanaka ....................... 720/664 |
| 5,617,395 A | 4/1997 | Choi |
| 5,847,901 A | 12/1998 | Hirsch |
| 6,226,250 B1 | 5/2001 | Tsai et al. |
| 6,345,027 B1 | 2/2002 | Saji et al. |

FOREIGN PATENT DOCUMENTS

| JP | 11283305 A | 10/1999 |
| JP | 2001297544 A * | 10/2001 |
| JP | 2002140849 A * | 5/2002 |
| WO | 0229802 A1 | 11/2002 |

OTHER PUBLICATIONS

ISR for Publication, International Publication No. WO2005/001834.
* cited by examiner

*Primary Examiner*—William J. Klimowicz
(74) *Attorney, Agent, or Firm*—Michael E. Belk

(57) ABSTRACT

A disk drive unit for a disk includes a mounting plate, a spindle motor assembly, a slide mechanism provided with a slide, a pickup unit mounted on the slide, a first transmission member operatively connected with the slide, and a second transmission member. The first transmission member is positioned such that it is in engagement with the second transmission member when the pickup unit is in its read and/or write position, and such that the first transmission member is out of engagement with the second transmission member when the pickup unit is in its home position. In order to bring the first and second transmission members into engagement, the transmission members are provided with engagement members. As a result, a limit switch assembly is no longer necessary.

10 Claims, 3 Drawing Sheets

PICKUP UNIT HOMING MECHANISM FOR A DISK DRIVE UNIT

The invention relates to a disk drive unit for a disk.

Disk drive units of this type are known in many embodiments thereof, and generally comprise a mounting plate, a spindle motor assembly, a pickup unit for reading and/or writing data on the disk, and a slide mechanism which is adapted to move the pickup unit along the surface of the disk between a home position and a read and/or write position. In general the slide is moved by a transmission assembly comprising a gear rack operatively coupled with the slide and in engagement with a gear wheel which is driven by a DC motor. In order to detect the home position of the pickup unit, disk drive units of this type generally comprise an additional limit switch which is adapted to stop the DC motor when the home position is reached. However, the use of a limit switch within a disk drive unit leads to additional assembly and material costs, which comprise in general the costs for a switch, some resistors and connectors, an I/O port and additional space on the circuit board.

It is an object of the invention to provide a disk drive unit for a disk wherein the above-mentioned additional limit switch is not needed.

In order to accomplish that objective, the disk drive unit according to the invention comprises a pickup unit mounted to a slide of a slide mechanism, which slide mechanism is adapted to move the pickup unit along the disk between a home position and a read and/or write position, the slide mechanism comprising a driven first transmission member which is operatively connected to the slide for moving slide, and a driving second transmission member which is only in engagement with the first transmission member when the pickup unit is in the read and/or write position, and wherein the pickup unit and the second transmission member comprise engagement members which are adapted to come into engagement at least when the second transmission member is not in engagement with the first transmission member so as to move the pickup unit away from the home position, which movement causes the first and second transmission members to engage.

In the disk drive unit according to the invention, the first and the second transmission member are disengaged when the pickup unit reaches its home position, whereby the movement of the pickup unit is stopped. In other words, the transmission assembly of the disk drive unit is adapted to stop the movement of the slide when the pickup unit reaches its home position, so that a limit switch is no longer necessary for detecting the home position of the pickup unit, which is cost-effective. In order to bring the first and the second transmission member back into engagement, the invention provides engagement members at the second transmission member and the pickup unit.

Further features have the advantage that the engagement members of the pickup unit and the second transmission member do not interfere with the movement of the pickup unit when it is moved to its home position.

A cam is also provided which has the advantage that the cam is a very simple and low-cost means for initiating the engagement of the engagement members of the pickup unit and the second transmission member. Moreover, as a movable bearing plate coupled to the actuator of the pickup unit is generally used in disk drive units, the addition of the cam is the only change to be made to the bearing plate in order to obtain the disk drive unit according to the invention, which is cost-effective.

Other features have the advantage that a gear rack and a gear wheel having a protrusion are simple to manufacture.

Further features have the advantage that the movement of the pickup unit away from its home position is controlled by a control unit which is already present within the disk drive unit.

Other features have the advantage that the engagement of the first and the second transmission member is detected by the detection of the surface of the disk, so that no additional detecting members are necessary for detecting the engagement of the transmission members, which is cost-effective.

The invention also relates to a device for reading and/or writing information, such as data, from/on an optical disk. The device according to the invention is provided with the disk drive unit according to the invention.

These and other aspects and advantages of the invention will be apparent from the following description with reference to the drawings.

The drawings show a preferred embodiment of the disk drive unit according to the invention. This disk drive unit 1 may be used in a device for reading and/or writing data on a disk, such as a compact disk player, which is adapted to read and/or write compact disks for audio and/or video by means of an optical or magnetic reading and/or writing member.

Figure 1:
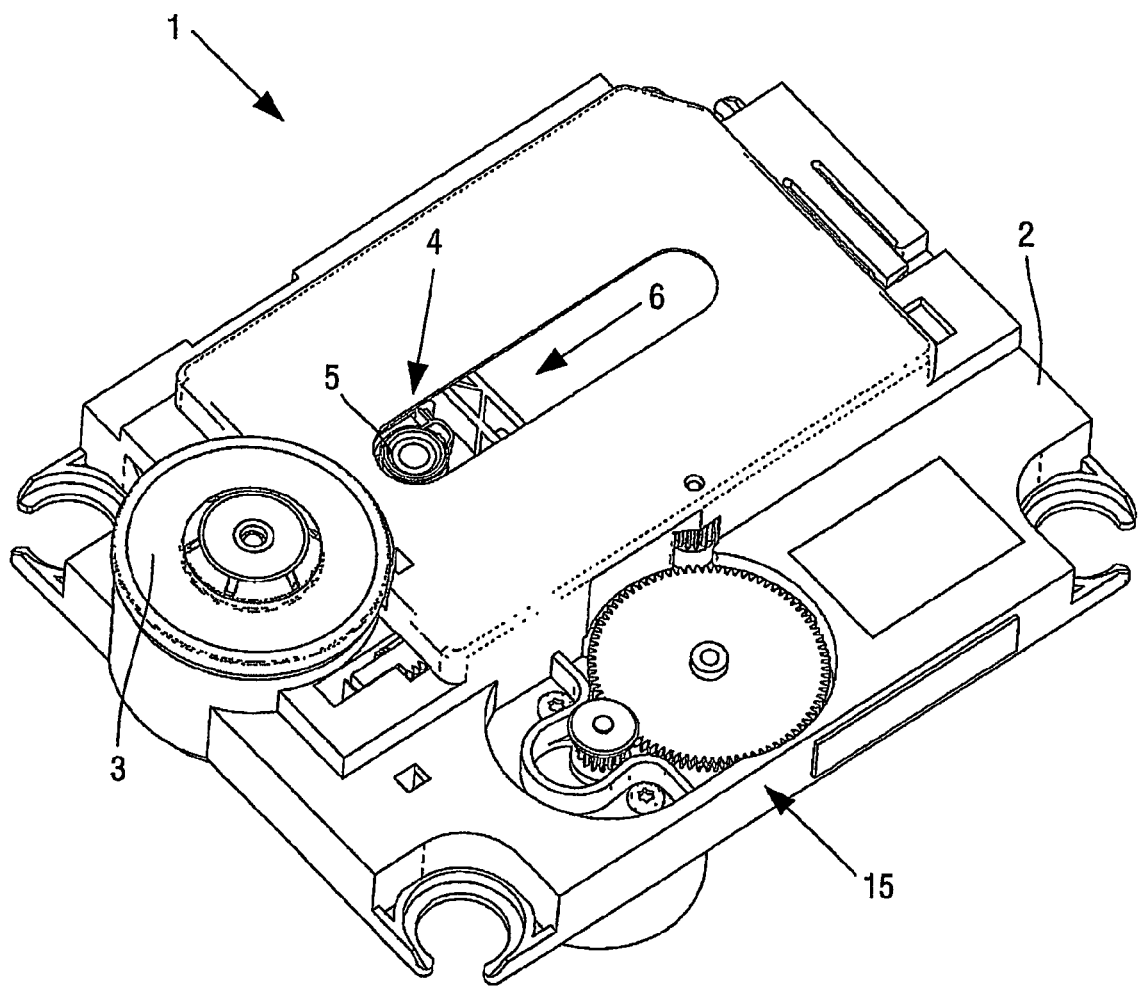
FIG. 1 is a perspective top view of a preferred embodiment of the disk drive unit according to the invention.
Figure 2:
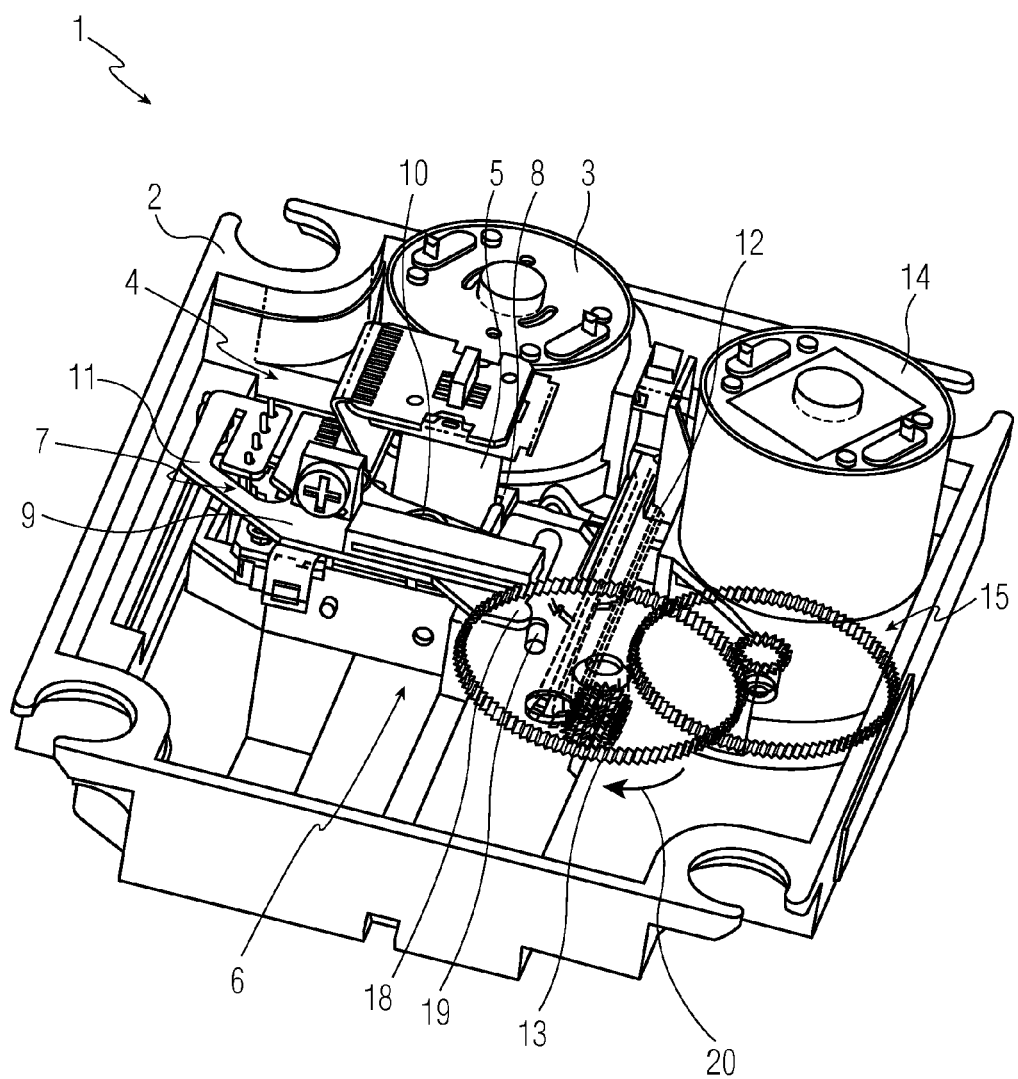
FIG. 2 is a perspective bottom view of the disk drive unit of FIG. 1.

With reference to FIGS. 1 and 2, the preferred embodiment of the disk drive unit comprises a mounting plate 2 and a spindle motor assembly 3 on the mounting plate which is adapted to support and to rotate a disk when positioned on the spindle motor assembly 3. In order to read and/or write the data on the disk, a pickup unit 4 is provided which comprises a laser assembly 5. In operation, the disk is rotated and the laser assembly 5 is translated along the disk in a radial direction with respect to the disk. The focusing of the laser assembly 5 in a perpendicular direction with respect to the disk is performed by a focus actuator mechanism within the laser assembly (not shown). The movement of the laser assembly in a radial direction along and with respect to the disk is performed by a slide mechanism 6 which roughly positions the pickup unit with respect to the disk and by a positioning mechanism 7 of the pickup unit 4 which performs the fine positioning of the laser assembly 5.

With reference to FIG. 2, the slide mechanism 6 of the preferred embodiment of the disk drive unit 1 comprises a slide 8, and the pickup unit 4 is mounted on the slide 8. The positioning mechanism 7 of the pickup unit 4 comprises a bearing plate 9 which is pivotably mounted to the slide 8 by means of a pivot pin 10. The positioning mechanism 7 further comprises an actuator 11 which is operatively connected to the bearing plate 9 and the slide 8. The actuator 11 is adapted to rotate the bearing plate 9 around the pivot pin 10 with respect to the slide 8. The laser assembly 5 is mounted to the bearing plate 9 at a distance from the pivot pin 10 such that the laser assembly 5 is slightly moved along the disk due to the rotation of the bearing plate 9.

The slide mechanism 6 of the preferred embodiment of the disk drive unit 1 is adapted to move the pickup unit 4 to a home position, which is near the spindle motor assembly 3 as shown in FIGS. 1 and 2, and an operating position where the laser assembly 5 of the pickup unit 4 is enabled to read and/or write the data on the disk. The home position of the pickup unit 4 is the starting point from which a read and/or write sequence of the disk is initiated.

With reference to FIG. 2, the slide mechanism 6 comprises a first and a second transmission member, wherein the first transmission member is a gear rack 12 mounted to the slide 8 and the second transmission member is a gear wheel 13 rotatably mounted to the mounting plate 2. The gear rack 12 is adapted to come into engagement with the gear wheel 13. When the gear wheel 13 and the gear rack 12 are engaged, the rotation of the gear wheel 13 leads to a displacement of the slide 8. As shown in FIG. 2, the preferred embodiment of the disk drive unit 1 comprises a DC motor 14 which is adapted to rotate the gear wheel 13 by means of a series of gearwheels 15.

Figure 3:
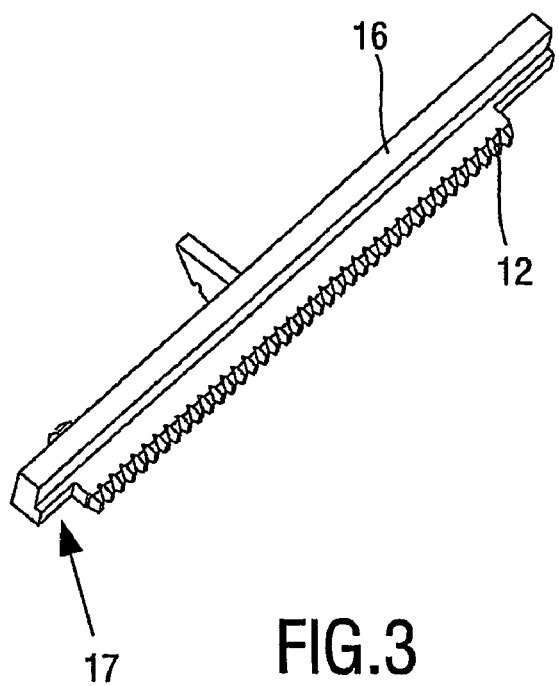
FIG. 3 is a perspective view of the first transmission member of the disk drive unit as shown in FIG. 2, on a larger scale.

The gear rack 12 of the preferred embodiment of the disk drive unit 1 is shown in more detail in FIG. 3. As shown, the gear rack 12 is formed on a mounting member 16 in order to be mounted to the slide 8. The mounting member 16 further comprises a freewheel section 17 provided at one end of the mounting member 16. The gear rack 12 is positioned at the mounting member 16 such that the gear wheel 13 is in engagement with the gear rack 12 when the pickup unit is in its read and/or write position, and such that the gear wheel 13 is positioned at the freewheel section 17 when the pickup unit 4 is in its home position. For the proper functioning of the slide mechanism 6, the freewheel section 17 is not strictly required and the part containing the freewheel section may therefore be omitted so that the gear rack is just shorter. The slide mechanism 6 will work properly when the gear wheel 13 and the gear rack 12 are disengaged with the pickup unit 4 in its home position due to the limited length and the position of the gear rack 12 with respect to the slide 8 and the gear wheel 13.

As shown in FIG. 2, the bearing plate 9 of the pickup unit 4 of the preferred embodiment of the disk drive unit 1 comprises a cam 18 as an engagement member. As the bearing plate 9 is rotatable due to the action of the actuator 11 of the pickup unit 4, the cam 18 is movable due to the action of the actuator 11 too.

Figure 4:
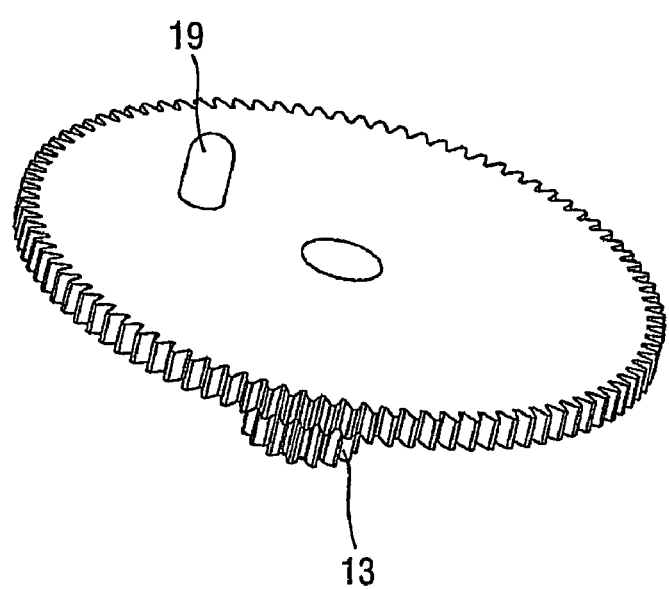
FIG. 4 is a perspective view of the second transmission member of the disk drive unit as shown in FIG. 2, on a larger scale.

As shown in FIGS. 2 and 4, the gear wheel 13 of the preferred embodiment of the disk drive unit 1 is provided with a protrusion 19 as an engagement member. The protrusion 19 is positioned such that it is enabled to come into engagement with the cam 18 of the pickup unit 4 only when the actuator 11 has moved the cam 18 towards the gear wheel 13 by rotating the bearing plate 9. As a result, the cam 18 and the protrusion 19 do not interfere with the movements of the pickup unit 4 when the pickup unit 4 is moved to its home position.

The preferred embodiment of the disk drive unit 1 further comprises a control unit (not shown) which is connected to the spindle motor assembly 3, to the laser assembly 5, to the actuator 11, and to the DC motor 14 (by means of electrical conductors, not shown). The control unit is adapted to power and control at least the above-mentioned electrical members.

With reference to FIG. 2, the operation of the slide mechanism 6 of the preferred embodiment of the disk drive unit is as follows:

After reading and/or writing of the data on the disk, the control unit applies a constant voltage to the DC motor 14 of the slide mechanism 6 during a fixed time period. The voltage is provided such that the gear wheel 13 is rotated in the direction indicated by arrow 20. As the gear rack 12 and the gear wheel 13 are in engagement, the pickup unit 4 mounted on the slide 8 is translated towards its home position. When the home position is reached, the gear rack 12 and the gear wheel 13 are disengaged due to the limited length and the position of the gear rack 12 with respect to the slide 8 and the gear wheel 13, whereby the movement of the pickup unit 4 is stopped and the gear wheel 13 is enabled to rotate freely about its axis at the position of the freewheel section 17 on the mounting member 16. The fixed time period of the voltage applied to the DC motor 14 of the slide mechanism 6 is based on the time which is needed for moving the pickup unit 4 from its outermost position towards its home position. As the gear rack 12 and the gear wheel 13 are disengaged when the pickup unit 4 reaches its home position, any remaining rotations of the gear wheel 13 in the case the pickup unit 4 has not been moved from its outermost position will not have any impact on the slide mechanism 6.

A start-up procedure is initiated when the fixed time period has passed and a new read and/or write sequence is desired. This start-up procedure is necessary for bringing the gear rack 12 and the gear wheel 13 back into engagement in order to enable the laser assembly 5 of the pickup unit 4 to read and/or write the data on the disk.

In the start-up procedure, the control unit powers the actuator 11 of the pickup unit 4 such that the cam 18 of the pickup unit 4 is brought into a position where it is enabled to come into engagement with the protrusion 19 on the gear wheel 13.

In the start-up procedure, the control unit also causes a series of voltage pulses to be applied to the DC motor 14 of the slide mechanism 6 such that the gear wheel 13 rotates stepwise in a direction opposite to arrow 20. The duration of each voltage pulse is such that the gear wheel 13 performs approximately half a revolution per voltage pulse. Thus, when the gear wheel 13 is rotated, the protrusion 19 on the gear wheel 13 will hit the cam 18 of the pickup unit 4 and as a result, the pickup unit 4 is moved away from its home position. This movement of the pickup unit 4 causes the gear rack 12 and the gear wheel 13 to come into engagement.

During the start-up procedure, the control unit also starts focusing of the laser assembly 5. During focusing, which is also performed during the reading and/or writing of the data on the disk, the laser assembly 5 is turned on in order to detect the information area of the disk. After each voltage pulse applied to the DC motor 14 of the slide mechanism 6, the control unit determines whether the laser assembly 5 has detected the information area of the disk. When the information area of the disk is detected by the laser assembly 5 during the start-up procedure, the gear rack 12 and the gear wheel 13 must be properly engaged and the start-up procedure is stopped. In general, the gear rack 12 and the gear wheel 13 will come into engagement within two or three half rotations of the gear wheel 13. In order to prevent a time consuming start-up procedure when no disk is placed within the disk drive unit or when the laser assembly 5 is unable to detect any information area on the disk, the sequence of applied voltage pulses is limited, preferably to six pulses.

As is clear from the above description, the engagement of the gear rack 12 and the gear wheel 13 is detected by the laser assembly 5 of the pickup unit 4, so that the pickup unit 4 is able to function as a detecting member, without the need for an additional component.

It should be understood from the above description that the movement of the pickup unit 4 is advantageously stopped at its home position due to the limited length and the position of the gear rack 12 with respect to the slide 8 and the gear wheel 13, and that the pickup unit 4 is moved away from its home position by the cam 18 on the pickup unit 4 and the protrusion 19 on the gear wheel 13 and by the action of the actuator 11 of the pickup unit 4, during all of which the control unit powers and controls the rotation of the gear wheel 13 and the action of the actuator 11. As a result, a limit switch for the detection of the home position of the pickup unit 4 is not required, which leads to a saving in manufacturing cost of the disk drive unit 1.

As the gear rack 12, the gear wheel 13 provided with the protrusion 19, and the cam 18 provided on the pickup unit 4 are very simple to manufacture, the manufacturing costs of these means are relatively low.

The invention is not restricted to the above examples as shown in the drawing, which can be varied in several ways without departing from the scope of the invention.

For example, it should be understood that the engagement member of the pickup unit is not limited to a cam and that the engagement member of the second transmission member is not limited to a protrusion provided on the second transmission member. The engagement members may be any kind of cooperating members, such as brushes or the like, as long as the pickup unit is pushed away from its home position by the movement of the second transmission member.

As a further example it should be understood that the first and the second transmission member are not limited to a gear wheel and a gear rack. Any set of transmission members may be provided, such as a running surface driven by a wheel or gear wheels comprising free running sections and operatively connected to the pickup unit in order to move the pickup unit.

In general it is noted that, in this application, the expression "comprising" does not exclude other elements, and "a" or "an" does not exclude a plurality. A single processor or unit may fulfil the functions of several elements in the appended claims. Reference signs in the claims shall not be construed as limiting the scope thereof.

The invention claimed is:

1. A disk drive unit for a disk comprising:
    a slide of a slide mechanism;
    a pickup unit mounted to the slide wherein the slide mechanism is adapted to move the pickup unit along the disk between a home position and a read and/or write position,
    the slide mechanism comprising:
        a driven first transmission member which is operatively connected to the slide for moving the slide; and
        a driving second transmission member which is only in engagement with the first transmission member when the pickup unit is in the read and/or write position,
    wherein the pickup unit and the second transmission member comprise engagement members which are adapted to come into engagement at least when the second transmission member is not in engagement with the first transmission member so as to cause movement of the pickup unit away from the home position, wherein the movement causes the first and second transmission members to engage;
    wherein the engagement member of the pickup unit is operatively coupled to an actuator of the pickup unit, and wherein the engagement member of the pickup unit is adapted to come into engagement with the engagement member of the second transmission member owing to action of the actuator of the pickup unit;
    wherein the engagement member of the pickup unit includes a cam at a bearing plate of the pickup unit, wherein the bearing plate is operatively coupled to the actuator of the pickup unit and is movable about a pivoting pin under action of the actuator of the pickup unit in order to move the cam into a position in which the cam is enabled to come into engagement with the engagement member of the second transmission member; and
    wherein the second transmission member includes a gear wheel.

2. The disk drive unit according to claim 1, wherein the engagement member of the second transmission member includes a protrusion provided on the second transmission member in a position such that the protrusion is enabled to come into engagement with the engagement member of the pickup unit.

3. The disk drive unit according to claim 1, wherein the first transmission member is a gear rack which is positioned such that the gear rack is in engagement with the gear wheel when the pickup unit is in the read and/or write position, and such that the gear rack is out of engagement with the gear wheel when the pickup unit is in the home position.

4. The disk drive unit according to claim 1, wherein the engagement of the engagement members of the pickup unit and the second transmission member is caused by a movement of the second transmission member and the simultaneous movement of the engagement member of the pickup unit into the position where the engagement member is enabled to come into engagement with the engagement member of the second transmission member.

5. The disk drive unit according to claim 1, further comprising a control unit that is programmed such that the drive of the second transmission member consists of a sequence of stepped driving movements, which sequence is stopped when the first and the second transmission member are in engagement, or when a preset amount of driving movements is reached.

6. The disk drive unit according to claim 1, wherein the second transmission member is operatively connected to a motor for driving the second transmission member.

7. A device for reading and/or writing information from/on an optical disk, provided with the disk drive unit as claimed in claim 1.

8. A disk drive unit for a disk comprising:
    a slide of a slide mechanism;
    a pickup unit mounted to the slide wherein the slide mechanism is adapted to move the pickup unit along the disk between a home position and a read and/or write position,
    the slide mechanism comprising:
        a driven first transmission member which is operatively connected to the slide for moving the slide; and
        a driving second transmission member which is only in engagement with the first transmission member when the pickup unit is in the read and/or write position,
    wherein the pickup unit and the second transmission member comprise engagement members which are adapted to come into engagement at least when the second transmission member is not in engagement with the first transmission member so as to move the pickup unit away from the home position, wherein the movement causes the first and second transmission members to engage, wherein the engagement of the first and the second transmission member is detected by a detecting member.

9. The disk drive unit according to claim 8, wherein the detecting member is formed by the pickup unit.

10. The disk drive unit according to claim 9, the further comprising a control unit that is programmed such that the driving movement of the second transmission member is stopped when the pickup unit detects the engagement of the first and the second transmission member by detecting a surface of a disk which is placed in the disk drive unit.

* * * * *